US006169160B1

(12) United States Patent
MacQueen et al.

(10) Patent No.: US 6,169,160 B1
(45) Date of Patent: Jan. 2, 2001

(54) CABLE PROTECTANT COMPOSITIONS

(75) Inventors: Richard C. MacQueen, Phillipsburg; Marc Jackson, Hawthorne, both of NJ (US); Mark S. Pavlin, Savannah, GA (US)

(73) Assignee: Union Camp Corporation, Wayne, NJ (US)

( * ) Notice: Under 35 U.S.C. 154(b), the term of this patent shall be extended for 0 days.

(21) Appl. No.: 09/225,888

(22) Filed: Jan. 4, 1999

Related U.S. Application Data

(63) Continuation-in-part of application No. 09/074,070, filed on May 6, 1999, now Pat. No. 5,998,570, and a continuation-in-part of application No. 08/939,034, filed on Sep. 26, 1996, now Pat. No. 6,111,055, and a continuation-in-part of application No. 08/734,523, filed on Oct. 18, 1996, now Pat. No. 5,783,657.

(51) Int. Cl.[7] .............................. C08G 69/08; G02B 6/44; B01J 13/00; H01B 17/00

(52) U.S. Cl. ......................... 528/310; 528/272; 528/288; 528/292; 528/322; 528/324; 528/326; 528/332; 528/339.3; 528/345; 528/397; 524/600; 524/606; 385/66; 385/84; 385/100; 523/173; 174/19; 174/76; 174/77 R; 439/275

(58) Field of Search ............................... 385/66, 84, 100; 174/76, 77 R, 19; 528/272, 288, 332, 310, 339.3, 326, 322, 345, 347, 292, 324; 524/600, 606; 523/173; 439/275

(56) References Cited

U.S. PATENT DOCUMENTS

| | | | |
|---|---|---|---|
| 2,379,413 | 7/1945 | Bradley | 260/404.5 |
| 2,450,940 | 10/1948 | Cowan et al. | 260/404.5 |
| 2,662,068 | 12/1953 | Floyd | 260/33.6 |
| 3,141,787 | 7/1964 | Goetze et al. | 106/252 |
| 3,148,125 | 9/1964 | Strianse et al. | 167/85 |
| 3,156,572 | 11/1964 | Carlick et al. | 106/27 |
| 3,341,465 | 9/1967 | Kaufman et al. | 252/316 |
| 3,615,289 | 10/1971 | Felton | 44/7.5 |
| 3,645,705 | 2/1972 | Miller et al. | 44/7.5 |
| 3,741,711 | 6/1973 | Bryant | 431/125 |
| 3,819,342 | 6/1974 | Gunderman et al. | 44/7.5 |
| 3,962,122 | 6/1976 | Trial | 252/392 |
| 4,042,544 | 8/1977 | Simon | 260/18 PN |
| 4,051,159 | 9/1977 | Tsoucalas et al. | 260/404.5 |
| 4,062,819 | 12/1977 | Mains et al. | 260/18 N |
| 4,105,619 | 8/1978 | Kaufman et al. | 260/33.6 PQ |
| 4,115,370 | 9/1978 | Corrado | 260/22 CQ |
| 4,128,436 | 12/1978 | O'Hara et al. | 106/243 |
| 4,150,002 | 4/1979 | Drawert et al. | 260/18 N |
| 4,190,570 | 2/1980 | Kaufman et al. | 260/33.6 PQ |
| 4,275,054 | 6/1981 | Sebag et al. | 424/65 |
| 4,337,298 | 6/1982 | Karim et al. | 428/461 |
| 4,341,671 | 7/1982 | Bolze et al. | 528/324 |
| 4,346,024 | 8/1982 | Coquard et al. | 524/219 |
| 4,369,284 | 1/1983 | Chen | 524/476 |
| 4,376,194 | 3/1983 | Tanaka et al. | 528/288 |
| 4,438,240 | 3/1984 | Tanaka et al. | 525/420 |
| 4,440,666 | 4/1984 | Miller et al. | 252/392 |
| 4,449,987 | 5/1984 | Lindauer | 44/7.5 |
| 4,552,693 | 11/1985 | Hussain et al. | 252/522 |
| 4,571,267 | 2/1986 | Drawert et al. | 106/27 |
| 4,663,428 | 5/1987 | Okitu et al. | 528/324 |
| 4,666,968 | 5/1987 | Downey et al. | 524/296 |
| 4,705,571 | 11/1987 | Lange et al. | 106/287.1 |
| 4,717,236 * | 1/1988 | Dewing | 350/96.23 |
| 4,720,164 * | 1/1988 | Oestreich | 350/96.23 |
| 4,721,832 | 1/1988 | Toy | 174/87 |
| 4,729,803 | 3/1988 | Hindman et al. | 156/48 |
| 4,764,422 | 8/1988 | Hill et al. | 428/309.9 |
| 4,767,184 * | 8/1988 | Ogasawara et al. | 350/96.23 |
| 4,769,285 | 9/1988 | Rasmussen | 428/355 |
| 4,870,117 | 9/1989 | Levy | 523/173 |
| 4,937,069 | 6/1990 | Shin | 424/66 |
| 5,069,897 | 12/1991 | Orr | 424/66 |
| 5,070,597 | 12/1991 | Holt et al. | 29/631 |
| 5,102,656 | 4/1992 | Kasat | 424/66 |
| 5,132,355 | 7/1992 | Nahlovsky | 524/474 |
| 5,187,763 | 2/1993 | Tu | 385/100 |
| 5,221,534 | 6/1993 | DesLauriers et al. | 424/78.03 |
| 5,243,675 | 9/1993 | Kathiresan et al. | 385/109 |
| 5,342,894 | 8/1994 | Robeson et al. | 525/183 |
| 5,348,669 | 9/1994 | Brauer et al. | 252/28 |
| 5,358,664 | 10/1994 | Brauer | 252/315.4 |
| 5,372,852 | 12/1994 | Titterington et al. | 427/288 |
| 5,402,516 | 3/1995 | Byler, Jr. et al. | 385/141 |
| 5,500,209 | 3/1996 | Ross et al. | 424/66 |
| 5,538,718 | 7/1996 | Aul et al. | 424/64 |
| 5,574,257 | 11/1996 | Brauer et al. | 174/76 |
| 5,578,089 | 11/1996 | Elsamaloty | 44/275 |
| 5,630,003 | 5/1997 | Arroyo | 385/113 |
| 5,645,632 | 7/1997 | Pavlin | 106/31.29 |
| 5,672,640 | 9/1997 | Brauer | 523/173 |
| 5,684,904 | 11/1997 | Bringuier et al. | 385/109 |
| 5,783,657 | 7/1998 | Pavlin et al. | 528/310 |

FOREIGN PATENT DOCUMENTS

| | | |
|---|---|---|
| 037 611 A1 | 10/1981 | (EP) . |
| 081 248 A1 | 6/1983 | (EP) . |
| 735 395 A2 | 10/1996 | (EP) . |
| WO 88/00603 | 1/1988 | (WO) . |
| WO 96/04886 | 2/1996 | (WO) . |
| WO 97/03117 | 1/1997 | (WO) . |
| WO 97/08282 | 3/1997 | (WO) . |

OTHER PUBLICATIONS

Yasuda et al., "Novel Low–molecular–weight Organic Gels: N,N', N"–Tristearyltrimesamide/Organic Solvent System," *Chemistry Letters*, pp. 575–576, 1996.

* cited by examiner

*Primary Examiner*—P. Hampton-Hightower
(74) *Attorney, Agent, or Firm*—Seed Intellectual Property Law Group PLLC

(57) ABSTRACT

Substrates that are moisture-sensitive and/or corrosion-sensitive, such as electrical components found in fiber optic cables, copper wires, terminal blocks, connections and junctions, are protected from moisture and/or corrosion with a protectant composition that includes a polyamide gelling agent, a gelled solvent, and optionally a bleeding agent. The electrical components are typically contacted with the protective composition to protect the sensitive component from moisture and/or corrosion.

20 Claims, 3 Drawing Sheets

CABLE PROTECTANT COMPOSITIONS

CROSS-REFERENCE TO RELATED APPLICATION

This application is a continuation-in-part of U.S. Patent application Ser. No. 09/074,070 filed May 6, 1999, now U.S. Pat. No. 5,998,570, U.S. patent application Ser. No. 08/939,034, filed Sep. 26, 1996, now U.S. Pat. No. 6,111,055 and U.S. patent application Ser. No. 08/734,523 filed Oct. 18, 1996, now U.S. Pat. No. 5,783,657.

TECHNICAL FIELD OF THE INVENTION

This invention generally relates to protecting moisture and/or corrosion sensitive substrates from moisture and/or corrosion, to articles that contain a moisture and/or corrosion sensitive component as well as a protectant composition; and to compositions that may be used to protect substrates from moisture and/or corrosion.

BACKGROUND OF THE INVENTION

Transmission cables (e.g., service or power wires/cables) as well as telecommunication devices (e.g., fiber optic cables, telephone cables, terminal blocks, junctions and connections) are often exposed to harsh environmental conditions. Yet, both are required to maintain uninterrupted mechanical and electrical characteristics despite the surrounding environmental conditions. In the past, transmission cables were strung above ground between poles, and occasionally, placed under water. Increasingly, these cables are being buried beneath the ground for aesthetic reasons and to protect them from extremes of temperature, rain, snow, ice, high winds, falling tree limbs and the like. However, even when placed underground, these cables are subject to many environmental stresses including mechanical shock during back filling, moisture, the possibility of water immersion, attack from rodents and exposure to salt and other corrosive materials.

Transmission cables typically contain either a bundle of individually insulated copper wires, or a bundle of fiber optic cables. The copper wires, in particular, are protected by an inner metal shield, which covers the bundle of wires, and an outer sheath made from plastic or other insulating material. Likewise, a communication cable is generally constructed of an outer plastic jacket and an inner metal core wrap with an annular space therebetween. See, e.g., U.S. Pat. No. 3,745,321 to Eager, Jr. et al. The core wrap enwraps a plurality of twisted insulated conductors with a filler material, such as petroleum, wax, or other hydrocarbons, located between the conductors. The filler material typically functions as an insulator.

Even though wires and cables are normally well protected, if the protective outer sheath is cut or otherwise broken, water can seep into the wire or cable. Whenever moisture is present in the interior of a cable or wire, it tends, over a period of time, to migrate or flow longitudinally into connections at the splice closures, terminals, or the like. In the special case of optical fibers, passage of the water to connection points or terminals and associated equipment can not only result in damage to such equipment, especially to any metal parts thereof, but can cause problems at low temperature or freezing environments due to fiber microbending. This is particularly true when an immersed wire is cut.

In an inadequately unprotected device, corrosion of the contacts or short circuits caused by moisture or other outside elements will eventually interrupt service. Replacement or repair of the cables, whether strung along the ground or buried, can be particularly difficult and/or expensive, and the interruption of service may be particularly irritating to the customer. Because of this, much attention has focused on the protection of these cables from both physical damage and from chemical attack. As a result, various techniques have been disclosed to prevent or restrict migration of moisture along cable internal passages.

In one such technique, cable passages may be filled by a pressurized gas. Upon an escape of gas through a ruptured cable jacket, an alarm provides notice of cable damage. However, the gas does not prevent the flow of water into and along the cable internal passages before the repair is effected.

U.S. Pat. Nos. 4,867,526, 5,082,719 and 5,163,115 disclose a super-absorbent polymer or tape which is impregnated with a superabsorbent material for preventing water migration through cables. It has been found that, for a number of reasons, the production and/or installation of these materials is often impractical and/or uneconomical.

Silicone grease lubricant, elastomeric seals, or mastic sealing strips have been used in an attempt to seal out moisture. While these sealants offer some protection, moisture can often seep into the enclosure and cause a short circuit, which will interrupt telecommunications service, particularly when the terminal block is buried underground.

It is also known that insulating materials, such as mineral oil, protect the conductor from moisture and corrosive materials. Such insulating materials, however, drip when the cable is being serviced (i.e., cut). To overcome this "dripping" problem, various gelling agents are know to be added to the insulator, to thereby provide a gelled, non-dripping protectant composition.

The requirements imposed on gelled protectant compositions for transmission cables and telecommunication devices are numerous. A gelled protectant composition must remain stable throughout the temperature range of use of the cable or device, which is typically from about −40° to +70° C. If the maximum working temperature of the gelled protectant composition is not at least as high as about +70° C., then during operation of the cable or device, the insulating material may be subjected to a temperature sufficient to reduce its viscosity to the point that it runs out of the enclosure, exposing the component to moisture and/or other environmental conditions that may induce corrosion. In addition, the gelled protectant composition must be sufficiently fluid over the temperature range experienced during installation, for the composition to completely fill the enclosure without the risk of breaking or over-stressing the components.

A gelled protectant composition should also be sufficiently cohesive to ensure that compression of the enclosure will not result in the formation of voids in either the interior or on the surface of the composition. Also, the gelled protectant composition should be soft enough to allow such compression without subjecting the protected components to any significant strain, and yet be resistant to flow under gravitational forces as well as the hydrostatic pressures likely to be applied to the protected components if the end of a service wire is exposed in a flooded manhole. Moreover, the gelling agent must not chemically attack the components of the service wire or the enclosure of the terminal block.

Due to the relatively long lengths of cable that are typically installed, certain cable components are made from inexpensive plastic components such as polypropylene in an attempt to reduce the cost of the cable as well as obtain multiple supply sources for such components. This presents a problem to the supplier of protectant compositions in that many such compositions are not compatible with materials such as polypropylene and can cause deterioration of those materials.

Hydrophobic fumed silica has been used as a gelling agent, particularly for fiber optic cables, however, hydrophobic fumed silica is expensive and relatively large amounts of fumed silica must be used to provide useful gels. Use of hydrophobic fumed silicas, moreover, can cause the resulting gels to be abrasive.

A need therefore exists for suitable protectant compositions to be used in transmission cables and telecommunication devices. More specifically, there exists a need for gelled cable filling) compositions having improved properties against moisture and corrosive materials, and which avoid the abrasiveness of silica-based gel formulations. The gelled compositions should be compatible with the insulating material, the cable wire and the cable components. The present invention fulfills these needs and further provides related advantages.

SUMMARY OF THE INVENTION

In one aspect, the present invention provides an article that includes a moisture-sensitive or corrosion-sensitive substrate in contact with a protectant composition. The protectant composition includes a polyamide gelling agent and a gelled solvent. The protectant composition is preferably shear thinning and/or non-dripping at the operating temperature of the protected article, and/or thermally stable at temperatures up to 50° C. for at least one week.

In a related aspect, the invention provides a m ethod of protecting a moisture-sensitive or corrosion-sensitive substrate against moisture or corrosion. The method includes contacting a substrate with a protectant composition. The protectant composition includes a polyamide gelling agent and a gelled solvent.

In a related aspect, the invention provides a protective composition that includes a polyamide gelling agent and a gelled solvent. The composition preferably further includes a bleed inhibitor.

In a related aspect, the invention provides a method of preparing a protectant composition. The method includes the steps of dissolving a polyamide gelling agent in a solvent at an elevated temperature in excess of 35° C.; combining a bleed inhibitor with the polyamide gelling agent; and cooling the resulting composition to a cooled temperature less than 35° C.

These and other aspects of the present invention will become evident upon reference to the following detailed description and attached drawings. In addition, various references are identified below and are incorporated by reference in their entirety.

BRIEF DESCRIPTION OF THE DRAWINGS

The reader's understanding of this invention will be enhanced by reference to the following detailed description taken in combination with the attached Figures, wherein.

DETAILED DESCRIPTION OF THE INVENTION

Figure 1:
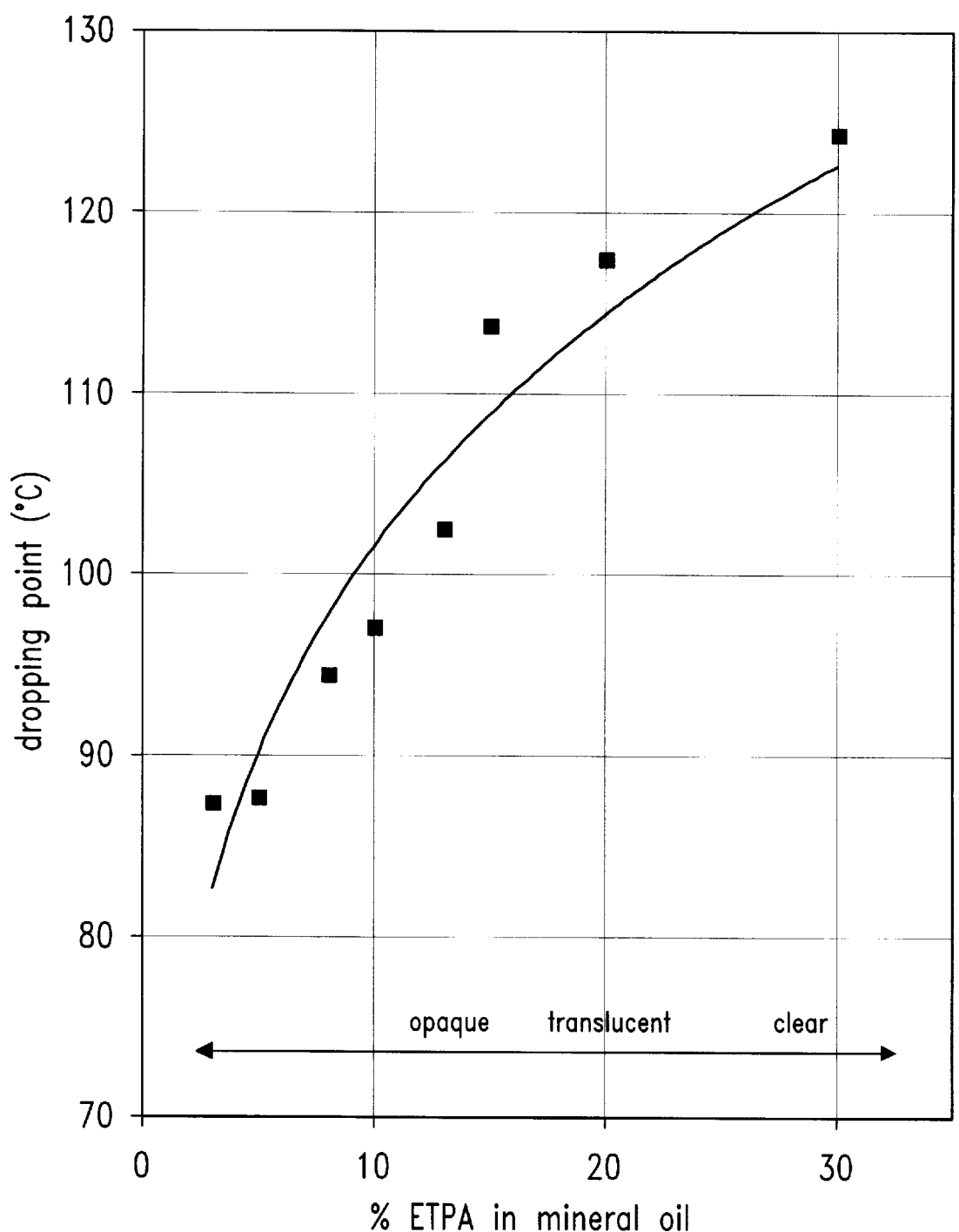
FIG. 1 represents the relationship between the dropping point of a protectant composition and the composition of the protectant composition, in terms of the relative amounts of polyamide gelling agent and mineral oil in the composition.

The present invention provides compositions that may be used to protect moisture-sensitive and/or corrosion-sensitive substrates from moisture and/or environmental factors that cause, or contribute to the corrosion of a substrate. The present invention fuirther provides articles that include a moisture-sensitive and/or corrosion-sensitive substrate in combination with a protectant composition therefor, and methods of protecting moisture-sensitive and/or corrosion-sensitive substrates with a protectant composition.

Moisture-sensitive and/or corrosion-sensitive substrates (hereinafter, "substrates") which may be protected according to the present invention generally include materials having performance properties that may be detrimentally effected by contact with moisture (i.e., water), and/or may undergo corrosion upon contact with corrosive environmental conditions. The present invention provides compositions, termed protectant compositions, that may be contacted with a substrate in order to shield or otherwise protect the substrate from contact with moisture and/or other corrosive conditions. The protectant composition therefore provides a barrier between the substrate and conditions, e.g., moisture, in the environment that may corrode the substrate or otherwise harm the performance properties of the substrate.

Exemplary substrates that may be protected according to the present invention are found within transmission cables and telecommunication devices. Telecommunication cables generally contain some kind of moisture-sensitive or corrosion-sensitive conductor, such as a fiber optic cable or a metal wire, where copper wire is an exemplary metal wire. Telecommunication cables having fiber optics are also referred to as data communication cables. Telecommunication devices generally include terminal blocks, connections and junctions. Transmission cables are also referred to as power cables, and generally conduct, or transmit, electricity or other energy source. Transmission cables typically include a copper wire within a sheath. Each of these materials may be harmed by exposure to moisture, and/or may undergo corrosion upon contact with harmful environmental factors, and accordingly are substrates which may be protected according to the present methods and with the present compositions.

The protectant composition of the present invention includes a solvent and a gelling agent for the solvent. Upon combination, the gelling agent and the solvent form a gel, (i.e., gelling agent and gelled solvent) where upon contact with a substrate, the gel affords protection to the substrate from harmfal environmental factors.

The gelling agent is a polyamide. In a preferred embodiment, the polyamide has a structure that results from the incorporation therein of dimer acid or a reactive equivalent thereof. The following U.S. Patents describe relatively high molecular weight polyamides that may be used as the gelling agent of the present protectant composition:

U.S. Pat. No. 3,645,705 to Miller et al., where the polyamide is derived from the reaction of dimerized linoleic acid with di- or polyamines and has a molecular weight (number or weight average) in the range of 6,000 to 9,000 and a softening point in the range of 48° C. to 185° C., and is capable of producing a gel structure in oil when the solubility of the polyamide in the oil is exceeded.

U.S. Pat. No. 3,819,342 to Gunderman et al., where a thermoplastic polyamide resin is the reaction products of dimerized linoleic acid with di- or polyamines, and these resins have an average molecular weight of between 2,000 and 10,000, and are described in greater detail in U.S. Pat. Nos. 2,379,413 and 2,450,940.

U.S. Pat. No. 3,615,289 to Robert Felton, disclosing solid polyamide resins that are the condensation product of an aliphatic dicarboxylic acid and a diamine, where the polyamides have a molecular weight within the range of from about 2,000 to about 10,000, and are of the type generally set forth in U.S. Pat. No. 2,450,940.

The polyamide gelling agent may be a relatively low molecular weight polyamide, of the type described in U.S. Pat. No. 5,783,657 to Pavlin and MacQueen and denoted therein as an Ester-Terminated PolyAmide (ETPA). ETPA comprises molecules of the formula (1), wherein n, $R^1$, $R^2$ and $R^3$ are defined below.

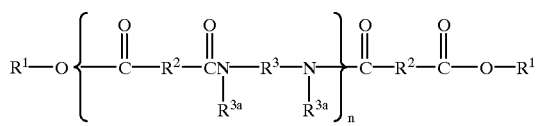

(1)

Thus, in one embodiment, the present invention is directed to gelled protectant compositions formed, in part, of an ester-terminated polyamide of the formula (1) wherein n designates a number of repeating units such that ester groups constitute from about 10% to 50% of the total of the ester and amide groups; $R^1$ at each occurrence is independently selected from $C_{1-42}$ hydrocarbon groups; $R^2$ at each occurrence is independently selected from $C_{2-42}$ hydrocarbon groups; $R^3$ at each occurrence is independently selected from an organic group containing at least two carbon atoms in addition to hydrogen atoms, and optionally containing one or more oxygen and nitrogen atoms; and $R^{3a}$ at each occurrence is independently selected from hydrogen, $C_{1-10}$ alkyl and a direct bond to $R^3$ or another $R^{3a}$ such that the N atom to which $R^3$ and $R^{3a}$ are both bonded is part of a heterocyclic structure defined in part by $R^{3a}$—N—$R^3$. U.S. Pat. No. 5,783,657 discloses various embodiments which are preferred therein, and which, in one embodiment of the present invention, are also preferred for preparing polyamide gelling agents in the protectant compositions described herein.

Preferably, the ETPA molecules are of relatively low molecular weight, so that n is preferably 1 to about 10, and more preferably is 1 to about 5. Because the ETPA molecules have such a low molecular weight, they could equally well be referred to as ester-terminated oligoamides. In any event, viewed another way, the ester groups constitute about 10% to about 50%, preferably about 15% to about 40%, and more preferably about 20% to about 35% of the total of the ester and amide groups.

The ETPA may be in combination with some molecules wherein n=0. However, such molecules, termed "diesters" because they do not contain any amide groups, are preferably present in minor amount since they are unable to gel hydrocarbons or ester solvents.

The diacid portion of the ETPA, i.e., the $R^2$ group, is preferably from dimer acid. However, some of the dimer acid may be substituted with shorter-chain diacid(s). Thus, the ETPA may be prepared with a mixture of dimer acid and "co-diacid", where the term co-diacid refers to any diacid of the formula HOOC—$R^2$—COOH (where $R^2$ is defined above) excluding polymerized fatty acid. An exemplary co-diacid is a so-called "linear" diacid of the formula HOOC—$R^2$—COOH wherein $R^2$ is a linear $C_{4-12}$ hydrocarbon group, and more preferably is a linear $C_{6-8}$ hydrocarbon group. Linear diacids suitable for the present invention include 1,6-hexanedioic acid (adipic acid), 1,7-heptanedioic acid (pimelic acid), 1,8-octanedioic acid (suberic acid), 1,9-nonanedioic acid (azelaic acid), 1,10-decanedioic acid (sebacic acid), 1,11-undecanedoic acid, 1,12-dodecanedioic acid (1,10-decanedicarboxylic acid), 1,13-tridecanedioic acid (brassylic acid) and 1,14-tetradecanedioic acid (1,12-dodecanedicarboxylic acid).

In one embodiment, in formula (1), n designates a number of repeating units such that ester groups constitute from 10% to 50% of the total of the ester and amide groups; $R^1$ at each occurrence is independently selected from an alkyl or alkenyl group containing at least 4 carbon atoms; $R^2$ at each occurrence is independently selected from a $C_{4-42}$ hydrocarbon group with the proviso that at least 50% of the $R^2$ groups have 30–42 carbon atoms; $R^3$ at each occurrence is independently selected from an organic group containing at least two carbon atoms in addition to hydrogen atoms, and optionally containing one or more oxygen and nitrogen atoms; and $R^{3a}$ at each occurrence is independently selected from hydrogen, $C_{1-10}$ alkyl and a direct bond to $R^3$ or another $R^{3a}$ such that the N atom to which $R^3$ and $R^{3a}$ are both bonded is part of a heterocyclic structure defined in part by $R^{3a}$—N—$R^3$, such that at least 50% of the $R^{3a}$ groups are hydrogen.

In preparing an ETPA gelling agent, the equivalents of carboxylic acid are substantially equal to the combined equivalents of hydroxyl contributed by monoalcohol and amine contributed by diamine. In other words, if the reaction mixture used to form an ETPA gelling agent has "x" equivalents of carboxylic acid, "y" equivalents of amine and "z" equivalents of hydroxyl, then $0.9 \leq \{x/(y+z)\} \leq 1.1$, and preferably $\{x/(y+z)\}$ is substantially 1.0. Under these conditions, substantially all of the carboxylic acid groups will react with substantially all of the hydroxyl and amine groups, so that the final product contains very little unreacted carboxylic acid, hydroxyl or amine groups. In other words, each of the acid and amine numbers of the gelling agent is preferably less than about 25, is more preferably less than about 15, and is still more preferably less than about 10, and is yet still more preferably less than about 5.

When co-diacid is employed to prepare an ETPA gelling agent, the co-diacid preferably contributes no more than about 50% of the equivalents of carboxylic acid present in the reaction mixture. Stated another way, the co-diacid contributes from 0–50 equivalent percent of the acid equivalents in the reaction mixture. Preferably, the co-diacid contributes 0–30 equivalent percent, and more preferably contributes 0–10 equivalent percent of the acid equivalents in the reaction mixture.

In order to prepare the ETPA gelling agent, it is important to control the relative equivalents of hydroxyl and amine used in the gelling agent-forming reaction. Thus, hydroxyl groups contribute about 10–70% of the total equivalents of hydroxyl and amine employed to prepare the gelling agent. Stated another way, $0.1 \leq \{z/(y+z)\} \leq 0.7$, where y and z have been defined above. In a preferred embodiment, $0.2 \leq \{z/(y+z)\} \leq 0.5$, while in a further preferred embodiment, $0.25 \leq \{z/(y+z)\} \leq 0.4$.

A suitable low molecular weight polyamide gelling agent may be prepared by a method that includes reacting x equivalents of carboxylic acid from diacid or a reactive equivalent thereof, y equivalents of amine from diamine and z equivalents of hydroxyl from monoalcohol or a reactive equivalent thereof, where monoalcohol is substantially the only monofunctional reactant used to form the polyamide, and wherein each of x, y and z is greater than 0, where these terms have been previously defined in U.S. Pat. No. 5,783,657.

Another suitable gelling agent is a tertiary amide-terminated polyamide, or ATPA, wherein the terminal amide groups are formed from secondary amines. ATPA comprises molecules of the formula (2) wherein n, $R^2$, $R^3$ and $R^4$ are defined below:

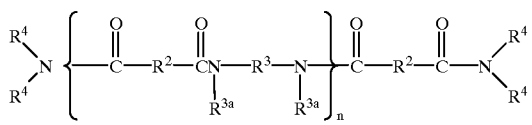

(2)

Thus, the invention is directed to gels formed, in part, of an amide-terminated polyamide of the formula (2) wherein n designates a number of repeating units such that tertiary terminal amide groups constitute from about 10% to about 50% of the total of the amide groups; $R^2$ at each occurrence is independently selected from $C_{2-42}$ hydrocarbon groups; $R^3$ at each occurrence is independently selected from an organic group containing at least two carbon atoms in addition to hydrogen atoms, and optionally containing one or more oxygen and nitrogen atoms; $R^{3a}$ at each occurrence is independently selected from hydrogen, $C_{1-10}$ alkyl and a direct bond to $R^3$ or another $R^{3a}$ such that the N atom to which $R^3$ and $R^{3a}$ are both bonded is part of a heterocyclic structure defined in part by $R^{3a}$—N—$R^3$; and $R^4$ at each occurrence is independently selected from $C_{1-22}$ hydrocarbon groups.

As may be seen from formula (2), the ATPA gelling agents have tertiary terminal amide groups, i.e., —N($R^4$)$R^4$ groups at both ends of a series of (non-terminal) amide groups, i.e., —N($R^{3a}$)C(=O)— groups (which may equally well be written as —C(=O)N($R^{3a}$)— groups). The letter "n" designates the number of repeating units present in a molecule of ATPA, and is an integer greater than 0. According to the invention, n may be 1, in which case the ATPA contains equal numbers of terminal amide and non-terminal amide groups, i.e., the terminal amide groups constitute 50% of the total of the amide groups in the ATPA molecule. The preferred ATPA gelling agents are of relatively low molecular weight, so that a is preferably 1 to about 10, and more preferably is 1 to about 5.

Because the ATPA molecules have such a low molecular weight, they could equally well be referred to as tertiary amide-terminated oligoamides. In any event, viewed another way, the terminal amide groups constitute about 10% to about 50%, preferably about 15% to about 40%, and more preferably about 20% to about 35% of the total of the amide groups. A preferred ATPA resin includes a mixture of ATPA molecules of formula (2) having various n values. The ATPA resin has a weight average molecular weight of less than about 10,000, and typically less than about 5,000, when measured by gel permeation chromatography (GPC) using polystyrene calibration standards.

In one embodiment, the $R^4$ group in formula (2) is an alkyl or alkenyl group which contains at least 1, typically at least 4, and preferably more than 4 carbon atoms, e.g., 8, 10, 12, 14, 16, 18, 20, 22 carbon atoms. Alkyl groups are preferred, however alkenyl groups having 1–3, and preferably 1 site of unsaturation are also suitable. The upper range for the number of carbon atoms in the $R^4$ group is not particularly critical, however preferably the $R^4$ group has less than or equal to about 22 carbon atoms. $R^4$ groups having about 16–22 carbon atoms are highly preferred. Linear $R^4$ groups are preferred in one embodiment of the invention. The identity of $R^4$ at any occurrence is independent of the identity of $R^4$ at any other occurrence.

The $R^2$ group in formula (2) is preferably a hydrocarbon containing 4 to 42 carbon atoms. A preferred $R^2$ group contains 30–42 carbon atoms (i.e., is a $C_{30-42}$ group), and at least 50% of the $R^2$ groups in an ATPA gelling agent preferably have 30–42 carbon atoms. Such $R^2$ groups are readily introduced into an ATPA when the gelling agent is prepared from polymerized fatty acid, also known as dimer acid. Polymerized fatty acid is typically a mixture of structures, where individual dimer acids may be saturated, unsaturated, cyclic, acyclic, etc. Thus, a detailed characterization of the structure of the $R^2$ groups is not readily available. However, good discussions of fatty acid polymerization may be found in, e.g., U.S. Pat. No. No. 3,157,681 and *Naval Stores—Production, Chemistry and Utilization*, D. F. Zinkel and J. Russel (eds.), Pulp. Chem. Assoc. Inc., 1989, Chapter 23.

While the preferred ATPA gelling agents contain at least 50% $C_{30-42}$ groups as the $R^2$ group, more preferably the total of the $R^2$ groups consist of at least 75% $C_{30-42}$ groups, and still more preferably consist of at least 90% $C_{30-42}$ groups. ATPA gelling agents of formula (2) wherein $R^2$ is entirely $C_{30-42}$ are preferred gelling agents of the invention.

However, ATPA gelling agents may also contain $R^2$ groups having less than 30 carbon atoms. For example, an ATPA gelling agent may contain one or more $R^2$ groups having about 2 to 19, preferably about 4 to 12, and more preferably about 4 to 8 carbon atoms. The carbon atoms may be arranged in a linear, branched or cyclic fashion, and unsaturation may be present between any two carbon atoms. Thus, $R^2$ may be aliphatic or aromatic. When present, these lower carbon-number $R^2$ groups are preferably formed entirely of carbon and hydrogen, i.e., are hydrocarbon groups. Such lower carbon-number $R^2$ groups preferably constitute less than 50% of the $R^2$ groups; however, when present, constitute about 1% to about 50%, and preferably about 5% to about 35% of the total of the $R^2$ groups. The identity of $R^2$ at each occurrence is independent of the identity of $R^2$ at any other occurrence.

The —N($R^{3a}$)—R—N($R^{3a}$)— group in formula (2) links two carbonyl (C=O) groups. In a preferred embodiment of the invention, all of the $R^{3a}$ groups in an ATPA gelling agent are hydrogen, so that $R^3$ alone joins the two nitrogen atoms shown in the formula —N($R^{3a}$)—$R^3$—N($R^{3a}$)—. In this case, the $R^3$ group contains at least two carbon atoms, and optionally oxygen and/or nitrogen atoms, in addition to any hydrogen atoms that are necessary to complete otherwise unfilled valencies of the carbon, oxygen and nitrogen atoms. In a preferred embodiment, $R^3$ is a hydrocarbon group, having 2 to about 36 carbon atoms, preferably having 2 to about 12 carbon atoms, and more preferably having 2 to about 8 carbon atoms. These carbon atoms may be arranged in a linear, branched or cyclic fashion, and unsaturation may be present between any two of the carbon atoms. Thus, $R^3$ may contain aliphatic or aromatic structures. The identities of $R^3$ and $R^{3a}$ at each occurrence are independent of their identities at any other occurrence.

The R³ groups may contain oxygen and/or nitrogen in addition to carbon and hydrogen atoms. A typical oxygen atom-containing R³ group is a polyalkylene oxide, i.e., a group having alternating alkylene groups and oxygen atoms. Indeed, the oxygenation in a R³ group is preferably present as an ether group. Representative polyalkylene oxides include, without limitation, polyethylene oxide, polypropylene oxide and copolymers (either random, alternating or block) of ethylene oxide and propylene oxide. Such oxygenated R³ groups are readily introduced into an ATPA molecule of the invention through use of JEFFAMINE™ diamines (Huntsman Chemical Inc., Houston, Tex.; http://www.huntsman.com). These materials are available in a wide range of molecular weights. While some of the R³ groups may contain oxygen (at least about 1%), preferably a minor number (less than 50%) of the R³ groups contain oxygen, and more preferably less than about 20% of the R³ groups contain oxygen. The presence of oxygen-containing R³ groups tends to lower the softening point of the ATPA.

When present, the nitrogen atoms in an R³ group are preferably present as secondary or tertiary amines. A typical nitrogen atom-containing R³ group having secondary amine groups is a polyalkylene amine, i.e., a group containing alternating alkylene groups and amine groups, which is sometimes referred to as a polyalkylene polyamine. The alkylene group is preferably a lower alkylene group, e.g., methylene, ethylene, (i.e., —CH₂CH₂—), propylene etc. A typical polyalkylene amine may be represented by the formula —NH—(CH₂CH₂NH)$_m$CH₂CH₂—NH— wherein m is an integer from 1 to about 5.

However, the nitrogen atoms in the nitrogen-containing R³ group may alternatively (or additionally) be present as tertiary nitrogen atoms, e.g., they may be present in a heterocycle of the formula:

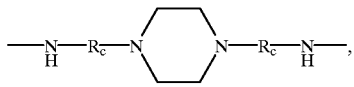

wherein $R_C$ is a $C_{1-3}$ alkyl group.

In the above-described nitrogen atom-containing R³ groups, R³ª was hydrogen. However, R³ª is not limited to hydrogen. In fact, R³ª may be a $C_{1-10}$ alkyl group, preferably a $C_{1-5}$ alkyl group, and more preferably a $C_{1-3}$ alkyl group. In addition, R³ and R³ª, or two R³ª groups, may together form a heterocyclic structure, e.g., a piperazine structure such as

. In this case, the two R³ª groups may be seen as joining together to form an ethylene bridge between the two nitrogen atoms, while R³ is also an ethylene bridge.

Compounds having the formula HN(R³ª)—R³—NH(R³ª), which are referred to herein as "diamine" are a preferred reactant to prepare ATPA and thereby introduce R³ and R³ª groups into ATPA. These diamines are commercially available from many sources, including Aldrich (Milwaukee, Wisc.) and Huntsman Chemical (Houstan, Tex.).

R⁴ groups may be incorporated into ATPA by including secondary amine of the formula NH(R⁴)(R⁴) among the ATPA-forming reactants. Such secondary amines are available from many commercial sources, for example, Akzo Nobel Chemicals, Surface Chemistry (Chicago, Ill.; http//www.akzonobelusa.com) and Aldrich (Milwaukee, Wisc.; http://www.aldrich.sial.com). Such secondary amines may be referred to herein as "monoamine" in order to distinguish them from "diamine", which is the other amine-containing reactant that is preferably used to prepare ATPA.

The ATPA gelling agent typically includes a mixture of ATPA molecules of formula (2) in addition to, for example, by-products that are formed during the ATPA-forming reaction. While the ATPA molecules of formula (2) may be purified from such by-products using, e.g., chromatography or distillation, the by-products are typically either minimal in amount or impart desirable properties to the gelling agent, and thus need not be separated from the molecules of formula (2) in order for a suitable ATPA gelling agent to be formed.

As described herein, amines (monoamine and diamine) and carboxylic acids are preferred starting materials to form the ATPA gelling agents of the invention. These starting materials are preferably reacted together with a stoichiometry, and under reaction conditions, such that the acid number of the resulting gelling agent is less than 25, preferably less than 15, and more preferably less than 10, while the amine number is preferably less than 10, more preferably less than 5, and still more preferably less than 1. The softening point of the gelling agent is preferably greater than room temperature, more preferably is about 50° C. to about 150° C., and still more preferably is about 80° C. to about 130° C.

It is important to control the stoichiometry of the reactants in order to prepare an ATPA gelling agent according to the invention. In the following discussion regarding reactant stoichiometry, the terms "equivalent(s)" and "equivalent percent" will be used, and are intended to have their standard meanings as employed in the art. However, for additional clarity, it is noted that equivalents refer to the number of reactive groups present in a molar quantity of a molecule, such that a mole of a dicarboxylic acid (e.g., sebacic acid) has two equivalents of carboxylic acid, while a mole of monoamine has one equivalent of amine. Furthermore, it is emphasized that the diacid has only two reactive groups (both carboxylic acids), the monoamine has only one reactive group (an amine group, and more specifically, a secondary amine group) and the diamine has only two reactive groups (preferably both primary amines), and these are preferably, although not necessarily, the only reactive materials present in the reaction mixture.

When co-diacid is employed to prepare an ATPA gelling agent, the co-diacid preferably contributes no more than about 50% of the equivalents of carboxylic acid present in the reaction mixture. Stated another way, the co-diacid contributes from 0–50 equivalent percent of the acid equivalents in the reaction mixture. Preferably, the co-diacid contributes 0–30 equivalent percent, and more preferably contributes 0–10 equivalent percent of the acid equivalents in the reaction mixture.

The stoichiometry of the reactants will have a significant impact on the composition of the ATPA gelling agents. For example, ATPA gelling agents made with increasing amounts of monoamine will tend to have lower (number and weight) average molecular weights. In other words, as more monofunctional reactant is used, the number of amide pairs in an average molecule of formula (2) will decrease. On the other hand, as less monoamine is used, the average molecular weight of the molecules in the ATPA gelling agent will increase. In general, increasing the average molecular weight of the ATPA component will tend to increase the melting point and melt viscosity of the gelling agent, which tends to provide a firmer gel when the gelling agent is combined with a low polarity liquid or other solvent.

In order to prepare an ATPA gelling agent, the above-described reactants (diacid, monoamine and diamine or reactive equivalents thereof) may be combined in any order. Preferably, the reactants are simply mixed together and heated for a time and at a temperature sufficient to achieve essentially complete reaction, to thereby form the ATPA gelling agent. During formation of the ATPA gelling agent, the diacid and diamine groups will alternate to form what may be termed an alternating copolymer. The ATPA is not a block copolymer. The terms "complete reaction" and "reaction equilibrium" as used herein have essentially the same meaning, which is that further heating of the product gelling agent does not result in any appreciable change in the performance characteristics of the product gelling agent, where the most relevant performance characteristic is the ability of the product gelling agent to form a clear, firm gel upon being combined with a solvent.

Thus, the ATPA gelling agent may be formed in a one-step procedure, wherein all of the diacid (including co-diacid), monoamine and diamine are combined and then heated to about 180–250° C. for a few hours, typically 2–8 hours. Longer reaction times are typically needed at lower reaction temperatures. Since one or more of the reactants may be a solid at room temperature, it may be convenient to combine each of the ingredients at a slightly elevated temperature, and then form a homogeneous mixture prior to heating the reaction mixture to a temperature sufficient to cause reaction between the diacid, monoamine and diamine. Alternatively, although less preferably, two of the reactants may be combined and reacted together, and then the third reactant is added followed by further heating until the desired product is obtained. Reaction progress may be conveniently monitored by periodically measuring the acid and/or amine number of the product mixture.

As one example, the diacid may be reacted with the diamine so as to form polyamide, and then this intermediate polyamide may be reacted with monoamine to form tertiary amide-terminated dimer acid-based polyamide. Or, the diacid may be reacted with the monoamine to thereby form diamide, and this diamide may be reacted with diamine to thereby form tertiary amide-terminated dimer acid-based polyamide. Because the components of the product gelling agent are preferably in reaction equilibrium (due to transamidation), the order in which the reactants are combined typically does not impact on the properties of the gelling agent.

Any catalyst that may accelerate amide formation between carboxylic acid and amine groups may be present in the reaction mixture described above. Thus, mineral acid such as phosphoric acid, or tin salts such as dibutyltin oxide, may be present during the reaction. In addition, it is preferred to remove water from the reaction mixture as it is formed upon amide formation. This is preferably accomplished by maintaining a vacuum on the reacting mixture, or by passing a gentle flow of an inert gas (e.g., nitrogen through the reaction mixture).

The protectant composition contains, at a minimum, a solvent in addition to a gelling agent. The gelled solvent may be a liquid or solid at room temperature, but is preferably a liquid. As used herein, the term solvent includes any substance which is a liquid at a temperature between 10–60° C., and which forms a gel upon being combined with a polyamide gelling agent. As used herein, the term solvent will be used to encompass oils and other fluids which may be gelled, and is not otherwise limited. Examples of solvents that are solid at room temperature include fatty acids and fatty alcohols, such as myristic acid (flash point >159° C.) and myristyl alcohol (flash point (>143° C.).

A preferred solvent is a low polarity liquid, while a preferred low polarity liquid is a hydrocarbon, and preferred hydrocarbons are oils, such as mineral oils. Mineral oils useful in the invention include, but are not limited to transformer oil, spindle oil, cable insulating oil and machine oil. In one embodiment, the mineral oil is food grade mineral oil. Examples of suitable, commercially available mineral oils include SONNEBORN™ and CARNATIONM white oils from Witco Corp. (Greenwich, Ct.); ISOPAR™ K and ISOPAR™ H from Exxon Corp. (Houston, Tex.); and DRAKEOLTm and PENETECKT white mineral oils from Penreco (Karns City, Pa.). These oils are preferably liquids at room temperature.

Other hydrocarbon solvents that may be used in the invention are relatively low molecular weight hydrocarbons including linear saturated hydrocarbons such a tetradecane, hexadecane, octadecane, etc. Cyclic hydrocarbons such as decahydronaphthalene (DECALIN™), fuel grade hydrocarbons, branched chain hydrocarbons such as PERMETHYL™ from Permethyl Corp. and ISOPAR™ from Exxon Corp. (Houston, Tex.); and hydrocarbon mixtures such as product PD-23T from Witco Corp. (Greenwich, Conn.) may also be used in preparing gels of the invention. Such hydrocarbons, particularly saturated hydrocarbon oils, are a preferred solvent for preparing a gel of the invention. The hydrocarbon solvent may be aliphatic (as described above) or aromatic. Suitable aromatic solvents include toluene and xylene.

Another class of suitable solvents is esters, and particularly esters of fatty acids. Such esters may be monofunctional esters (i.e., have a single ester moiety) or may be polyfunctional (i.e., have more than one ester group). Suitable esters include, but are not limited to, the reaction products of $C_{1-24}$ monoalcohols with $C_{1-22}$ monocarboxylic acids, where the carbon atoms of both the monoalcohol and monocarboxylic acids may be arranged in a linear, branched and/or cyclic fashion, and unsaturation may optionally be present between carbon atoms. Preferably, the ester has at least about 18 carbon atoms. Examples include, but are not limited to, fatty acid esters such as isopropyl isostearate, n-propyl myristate, isopropyl myristate, n-propyl palmitate, isopropyl palmitate, hexacosanyl palmitate, octacosanyl palmitate, triacontanyl palmitate, dotriacontanyl palmitate, tetratriacontanyl palmitate, hexacosanyl stearate, octacosanyl stearate, and triacontanyl stearate. Other suitable esters include glycerol and propylene glycol esters of fatty acids, including the so-called polyglycerol fatty acid esters and triglycerides.

Preferably, the solvent is a low-polarity liquid as described above, and more preferably the solvent is a liquid hydrocarbon. The liquid may contain more than one component, e.g., hydrocarbon as well as ester-containing material. In the mixture, the gellant (e.g., ETPA) typically contributes 10–95%, and the solvent typically contributes 5–90% of the combined weight of the gellant and the solvent. Preferably, the gellant is combined with the solvent such that the weight percent of gellant in the gellant+solvent mixture is about 5–50%, and preferably is about 10–45%. Such gels may be transparent, translucent or opaque, depending on the precise identities of the gellant and solvent, as well as the concentration of gellant in the mixture. Generally, the appearance of the gelled protectant composition is unimportant when it is used within the interior of a cable.

In one embodiment, the protectant composition further includes a bleed inhibitor. The bleed inhibitor serves to reduce, or eliminate, any syneresis that may otherwise occur in the protectant compositions. U.S. Pat. No. 4,701,061 discloses bleed inhibitors that may be incorporated into the present protectant compositions. Thus, the bleed inhibitor may be one or more of a polyurethane elastomer, polyester elastomer, butadiene acrylonitrile copolymer, polyacrylate, acrylate copolymer and rubber block copolymer. In one embodiment, the bleed inhibitor is fumed silica.

In order to prepare a gel from a solvent and gelling agent, the two components are mixed together and heated until homogeneous. A temperature within the range of about 80–150° C. is typically sufficient to allow the gelling agent to completely dissolve in the solvent. A lower temperature may be used if a homogenous solution can be prepared at the lower temperature. Upon cooling, the mixture formns the gelled protectant composition of the invention. The bleed inhibitor, and any other optional components, are preferably added to the molten composition, and are dispersed and/or dissolved to provide a homogeneous composition prior to cooling of the molten composition.

The protectant composition should meet three important criteria in order to be advantageously used as a cable filling composition for fiber optic cables. Those criteria are non-dripping behavior at temperatures up to about 80° C., shear thinning behavior, and heat stability at 50° C. for at least one week. The non-dripping behavior is desirable in order that the protectant composition does not flow out of the cable in the event the cable is cut or spliced. The non-dripping behavior should be exhibited at temperatures up to, and including, the working temperature of the cable, which is typically less than about 80° C. The temperature at which the protectant composition starts to drip will be referred to herein as the dripping temperature.

In general, the dripping temperature of a protectant composition will increase as the softening point of the polyamide gellant increases. Increases in the softening point of a polyamide gellant may generally be achieved by incorporating short-chain diacids into the polyamide reactant formulation, where short-chain diacids have about 2–12 carbon atoms including two carboxylic acid groups. Sebacic and azelaic acid are two exemplary short-chain diacids. Increases in dripping temperature may also be achieved by incorporating greater proportions of the polyamide gelling agent in the protectant composition. The dripping temperature of a protectant composition can be measured in the laboratory, to a close approximation, by determining the dropping point of the protectant composition, where dropping points may be measured using a Mettler FP 900 dropping point apparatus available from Mettler-Toledo International, Inc. (CH-8606 Greifensee, Switzerland; http://www.mt.com). Preferred protectant compositions of the present invention have dripping temperatures in excess of 80° C., more preferably in excess of 90° C., 100° C., 110° C., 120° C. or 130° C.

Shear thinning behavior is desirable in a protectant composition so that the composition does not put mechanical stress on the fiber optic portion of the cable, when the composition is being pumped into the cable. Whether a protectant composition has shear thinning properties can be determined by measuring the viscosity of the composition as a function of shear rate. Instruments that can make these measurements are well known in the art. One such instrument is the Rheometrics Dynamic Analyzer Model 70 (Rheometric Scientific, Inc.; Piscataway, N.J.), however other instruments capable of performing Dynamic Mechanical Analysis may also be employed. Preferred protectant compositions of the present invention display shear thinning behavior at 25° C.

Moisture and/or corrosion-sensitive substrates in a cable may be exposed to elevated temperature for extended periods of time. It is therefore desirable that the protectant composition retain its protective properties under these conditions. Whether a protectant composition is stable at 50° C. can be determined by measuring relevant properties of the protectant composition before and after exposure to 50° C., where the exposure time is typically at least one week. Solvents commonly employed in cable filling compositions, such as hydrocarbons and esters, are stable at 50° C. Accordingly, whether the protectant composition will be stable is largely a function of the stability of the gelling agent. Whether a gelling agent is thermally stable may be determined by measuring its molecular weight before and after exposure to the relevant elevated temperature.

Molecular weight measurements are readily made by dissolving a sample of the gelling agent in a suitable solvent, and then using gel permeation chromatography (GPC) to measure the molecular weight of the gelling agent. Polystyrene standards may be used to calibrate the GPC instrument. Typically, the molecular weight of the gelling agent is much larger than the molecular weight of the solvent, and accordingly a sample of the heated protectant composition may be characterized by GPC, and thereby any changes in the molecular weight of the gelling agent are readily determined. Preferred gelling agents of the present invention are stable, in terms of their molecular weight, at 50° C.

When the protectant composition is used as a cable filling composition for copper or other metal wire-containing cables, it is desirable that the protectant composition have a dielectric strength that is approximately equal to, or somewhat greater than, the dielectric strength of the ungelled solvent used in the protectant composition. Dielectric strength may be measured according to standard procedures known to one of ordinary skill in the art. See, e.g., ASTM D 149 (American Society for Testing and Materials, West Conshohocken, Pa.; http://www.astm.org). The dielectric strength of the protectant composition that incorporates polyamide gelling agent is preferably at least about 50% of the dielectric strength of the same composition absent the polyamide gelling agent.

Thus, the present invention provides a method of protecting a moisture-sensitive or corrosion-sensitive substrate against moisture or corrosion, wherein the substrate is contacted with a protectant composition as described above, containing, at a minimum, a polyamide gelling agent and a gelled solvent. The "contacting" preferably covers all of the substrate from which it is desired to exclude moisture and/or corrosion causing agents. In order to contact the substrate, the protectant composition may be warmed to a fluid composition, and then poured onto, or sprayed onto, or brushed onto, or otherwise applied to the substrate. Alternatively, the substrate may be dipped into the fluid protectant composition.

The protectant composition preferably exhibits shear thinning behavior. Thus, upon stirring, the protectant composition will assume a lower viscosity. This lower viscosity form of the composition may conveniently be applied to a substrate using any of spraying, brushing, dipping, etc. When the protectant composition will be disposed between a moisture and/or corrosion sensitive component of a cable, and the sheath of the cable, the protectant composition may be extruded into the interstitial space of the cable. The extrusion process itself may cause the viscosity of the protectant composition to be sufficiently low that the protectant composition will flow into the cable. Alternatively, the protectant composition may be warmed to enhance its fluid character.

The protectant composition preferably does not contain any chemically reactive groups, so that the composition is essentially inert. Chemically reactive groups include carboxylic acid and amine groups. Accordingly, the acid and amine numbers for the polyamide gelling agents are both preferably low, that is less than 10, and more preferably less than about 1. Preferably, the polyamide gelling agent does not contain any appreciable free amine or free carboxylic acid.

Thus, in a preferred embodiment of the invention, the protectant composition is used as a cable filling composition, or a component of a cable filling composition. The following publications disclose various cables that may be filled by the compositions of the present invention and/or set forth various additives that may be included in the cable filling compositions of the present invention, and/or various techniques by which a cable may be filled by the cable filling compositions of the present invention: U.S. Pat. Nos. 5,402, 516; 5,358,664; 5,348,669; 5,243,675; 5,187,763; 4,870, 117; 4,666,968; 4,190,570; 4,105,619; European Patent Application No. 0 735 395 A2 and 0 037 611 A1.

The following examples are offered by way of illustration and not by way of limitation.

EXAMPLES

EXAMPLE 1 ETPAS AS GELLING AGENTS

Five ester-terminated polyamides (labeled ETPA A, B, C, D, and E) were prepared having the compositions set forth in Table 1. In Table 1, under the column "Composition (eq %)", each of ETPAs A through E is characterized by two lines, where the top lines refers to the acids that were used to prepare the ETPA, and the lower line refers to the diamine and monoalcohol that were used to prepare the ETPA. The percentages values in this column are based on the total of the acid equivalents (top line) and the total of the amine and hydroxyl equivalents (lower line) used in preparing the ETPA, where the reactants were combined such that the acid equivalents equaled the total of the amine and alcohol equivalents. In Table 1, viscosity values were measured when the sample was at 160° C.

In Table 1, ALFOL™ 18 is stearyl alcohol from CONDEA Vista Company (Houston, Tex.; http://www.condea.com); EDA is an abbreviation for ethylene diamine, from Aldrich (Milwaukee, Wisc.; http:I/www.aldrich.sial.com); EMPOL™ 1008 is hydrogenated second pass dimer acid from Henkel Corporation, Emery Oleochemicals Division (Cincinnati, Ohio; http://www.henkelcorp.com); EPAL™ 1618 is a mixture of $C_{16}$–$C_{18}$ alcohols from Amoco Corporation, Amoco Chemicals Division (Lisle, Ill.; http://www.amocochem.com); DRAKEOL™ 7 is a mineral oil from Penreco, a division of Pennzoil Products Company (Karns City, Pa.; http://www.chemexpo.com/show/exhibitorhall/penreco/chemindex.cfm); UNIDYME™ 18 is unhydrognated first pass dimer acid from Union Camp Corporation, Chemical Products Division (Jacksonville, FL; http://www.unioncamp.com).

TABLE 1

COMPOSITIONS AND PROPERTIES OF ETPAS USED AS GELLING AGENTS

| ETPA | Composition (eq %) | Acid No. | Amine No. | S.P. (° C.) | Visc. (cPs) |
|---|---|---|---|---|---|
| A. | 90% EMPOL ™ 1008, 10% sebacic acid; 63.7% EDA, 34.3% ALFOL ™ 18 | 9.3 | 1.3 | 133.5 | 65 |
| B. | 90% UNIDYME ™ 18, 10% sebacic acid; | 11.6 | 1.1 | 120.1 | 73.9 |

TABLE 1-continued

COMPOSITIONS AND PROPERTIES OF ETPAS USED AS GELLING AGENTS

| ETPA | Composition (eq %) | Acid No. | Amine No. | S.P. (° C.) | Visc. (cPs) |
|---|---|---|---|---|---|
| | 55.6% EDA, 40.2% EPAL ™ 1618 | | | | |
| C. | 90% EMPOL ™ 1008, 10% sebacic acid; 55.6% EDA, 40.2% ALFOL ™ 18 | 17.9 | 1.1 | 125.1 | 33.5 |
| D. | 100% EMPOL ™ 1008; 61.3% EDA, 34.5% ALFOL ™ 18 | 16.5 | 0.4 | 83.9 | 92.5 |
| E. | 88% EMPOL ™ 1008, 12% sebacic acid; 61.4% EDA, 34.6% ALFOL ™ 18 | 15.0 | 0.6 | 135.6 | 92.5 |

ETPA D was prepared with EMPOL™ dimer acid as the only acid-containing reactant (and using a 61.3/34.5 EDA/ALFOL™ stearyl alcohol ratio), and had a softening point of 83.9° C. In order to increase the softening point of the ETPA, and thereby increase the working temperature of a gel prepared therefrom, a portion of the dimer acid was replace with sebacic acid. The result is shown with ETPA E, which has a softening point of 135.6° C. when sebacic acid contributes 12% of the total acid equivalents.

The softening point of a gelled protectant composition can also be increased by incorporating greater amounts of the gelling agent (e.g., ETPA) in the composition. The effect of gellant concentration on the softening point of the gelled protectant composition is shown in FIG. 1, for various concentrations of ETPA A in DRAKEOL™ 7 mineral oil. Softening points as reported in Table 1 were measured using a Mettler FP 900 dropping point apparatus (Mettler-Toledo International, Inc.; CH-8606 Greifensee, Switzerland; http://www.mt.com) operated using a 2.8 mm diameter cup without a lead weight, and a heating rate of 1.5° C./min.

Thus, as shown in FIG. 1, the softening point ranges from about 88° C. at 3–5 wt % (weight percent) ETPA, to over 120° C. at 30 wt % ETPA, in mineral oil. At ETPA concentrations above about 25%, the gelled composition was clear and hard, while below about 25 wt % ETPA, the compositions were translucent or opaque, somewhat soft gels. FIG. 1 shows that at 30 wt % ETPA, the dropping point of the gelled composition was nearly the same as the softening point of the neat ETPA. This data suggests that an ETPA-based gelled protectant composition, which should not drip at 80° C. or below, could be prepared from ETPA A at an ETPA A concentration of 3 wt % or greater.

Figure 2:
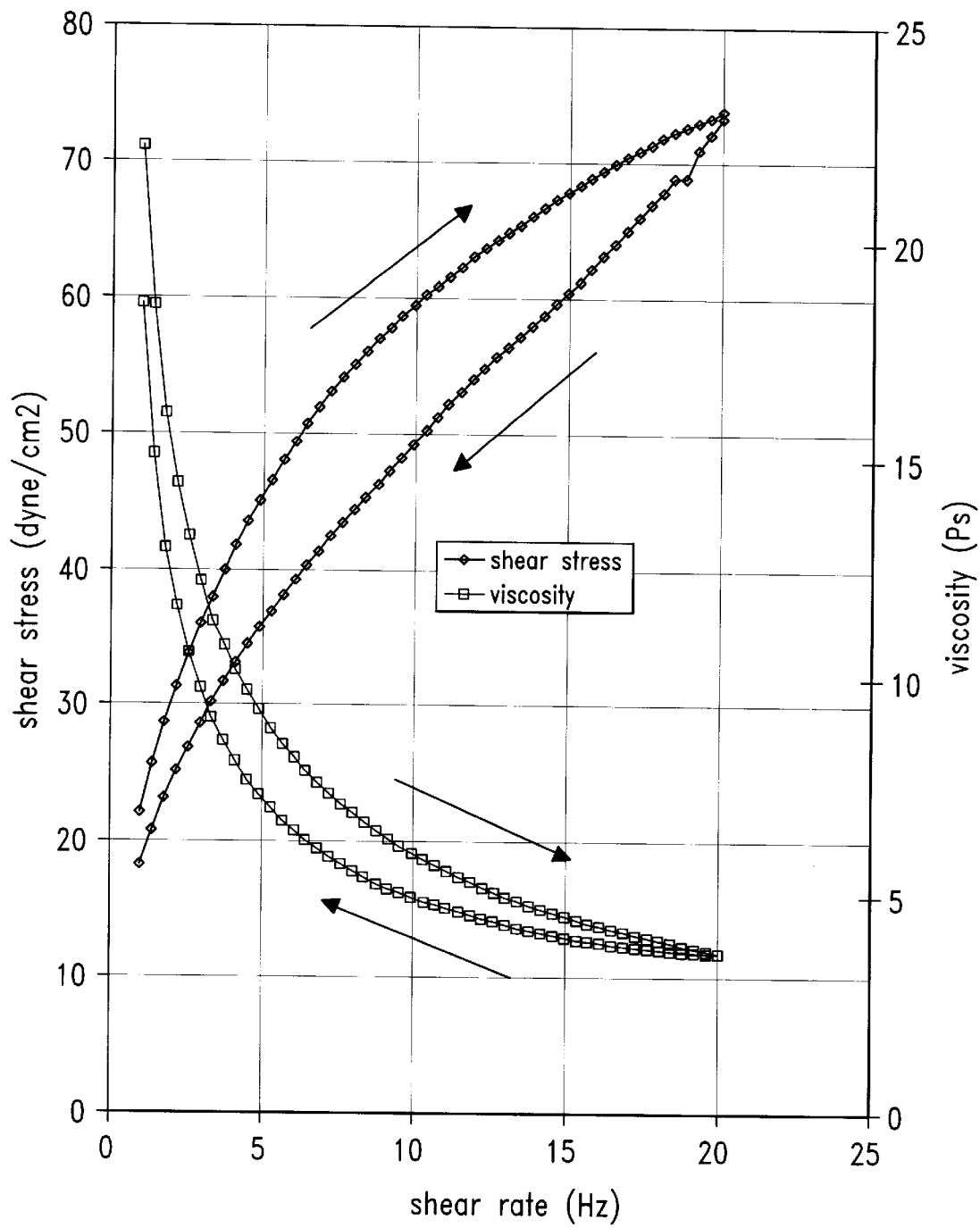
FIG. 2 represents the relationship between the shear stress of a protectant composition and the shear rate under which the determination of shear stress was made, for a protectant composition having 3 wt % polyamide.

Since the 3% gelled protectant composition prepared from ETPA A and DRAKEOL™ 7 mineral oil was a soft gel compared to the very rigid composition that resulted when ETPA A was at 30 wt % solids, the shear thinning behavior of the 3 wt % composition was determined at 25° C. as shown in FIG. 2. Shear thinning is defined as a decrease in viscosity as a function of increasing shear rate. Measurements shown in FIG. 2 were made using Dynamic Mechanical Analysis (DMA). The data indicates that as the shear rate was increased, the viscosity of the gel decreased, and when the shear rate was decreased the viscosity increased. This type of non-Newtonian viscosity behavior indicates shear thinning behavior.

To determine the high-temperature stability of the ETPA-based protectant compositions, the molecular weights of two ETPA gellants (ETPA D and ETPA E, from Table 1), were measured before and after exposure to 50° C. for 48 hours.

The results are shown in Table 2, and demonstrate that ETPA gellants are stable at 50° C. for at least 48 hours. Molecular weight (MW) measurements were performed using gel permeation chromatography, and polystyrene standards.

TABLE 2

GPC MW DATA FOR AGED AND UNAGED ETPAS

| ETPA | Aging | $M_n$ | $M_w$ | $M_z$ |
|---|---|---|---|---|
| D | None | 2064 | 4234 | 6467 |
|   | 48 h @ 50° C. | 2065 | 4263 | 6510 |
| E | None | 2004 | 4070 | 6214 |
|   | 48 h @ 50° C. | 2001 | 4053 | 6205 |

Attempts were also made to determine the dropping point, shear thinning behavior, and heat stability of mineral oil thickened with famed silica, but dispersion (activation) of the fumed silica in the mineral oil required very high shear. In contrast, polyamide gelling agents are easily combined with solvents to provide a gelled protectant composition, without recourse to expensive high shear mixers.

EXAMPLE 2 DIELECTRIC STRENGTHS OF PROTECTANT COMPOSITIONS

Two ETPAs were prepared, from the reactants listed in Table 3. Since ETPA F contains less monofunctional reactant (i.e., less stearyl alcohol) than ETPA G, ETPA F will have a higher molecular weight than ETPA G.

TABLE 3

REACTANTS USED TO PREPARE TWO ETPAS

| ETPA | Dimer Acid | Stearyl Alcohol | EDA |
|---|---|---|---|
| F. | 76.4 wt % | 17.7 wt % | 5.9 wt % |
| G. | 71.9 wt % | 23.3 wt % | 4.8 wt % |

Figure 3:
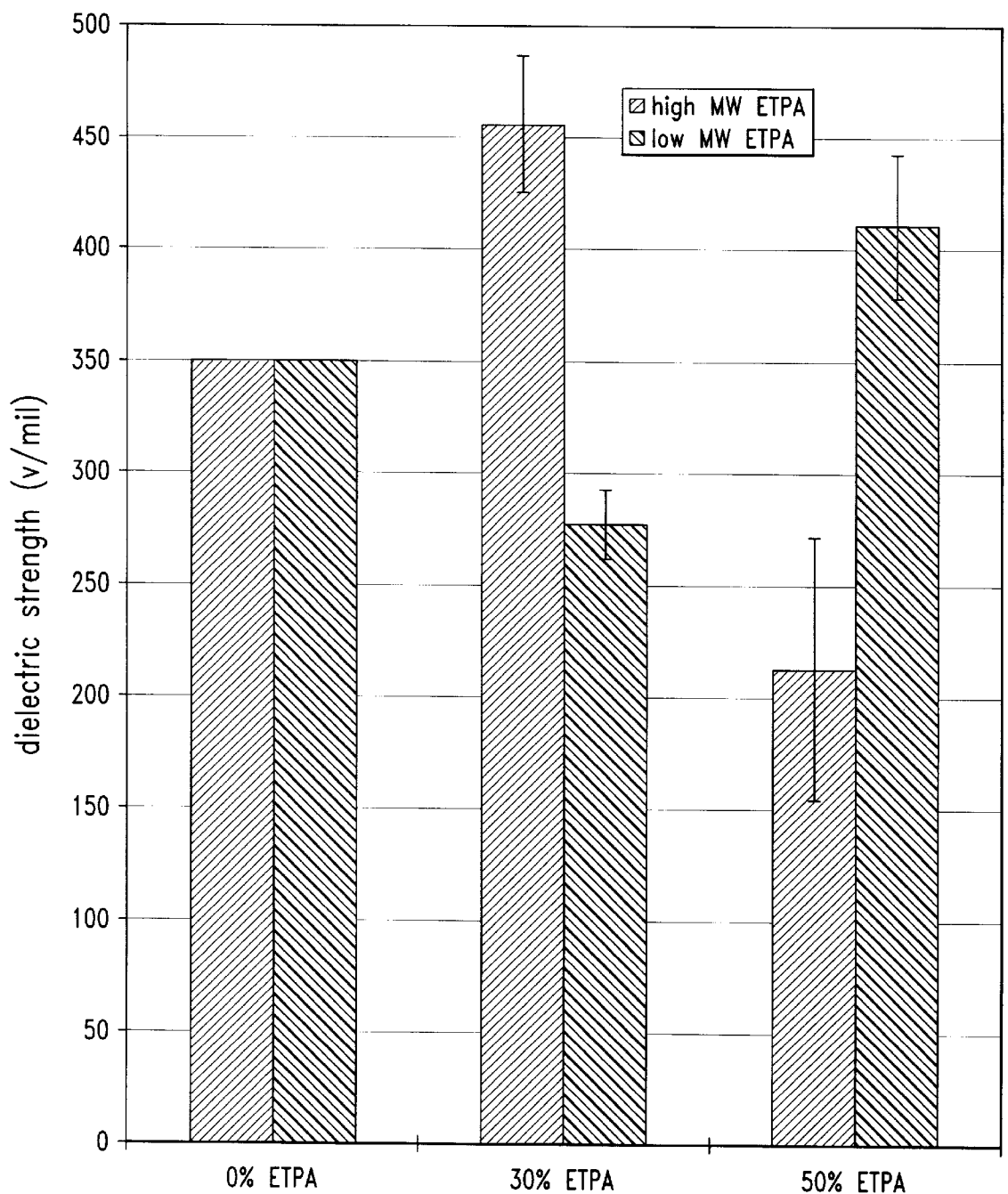
FIG. 3 represents the dielectric strengths of five compositions, where the gelling agent is present in the composition at a concentration of either 0 wt %, 20 wt % or 50 wt %, and the gelling agent is either a high or low molecular weight polyamide gelling agent.

The dielectric strengths of five compositions were determined according to ASTM D, using DF-100 alkyl benzene dielectric (Shrieve Chemical, the Woodlands, Tx.; http://www.shrieve.com) as the solvent, with the results shown in FIG. 3. As shown in FIG. 3, the solvent itself had a dielectric of 350 volts/mil (see 0% ETPA), while a combination of the solvent and an ETPA (at each of 20 wt % and 50 wt % ETPA solids, and using both of ETPA F and ETPA G) provided compositions with dielectric strengths which, within experimental error, were approximately the same as the non-gelled solvent. Accordingly, the presence of the ETPA gellant does not significantly impair the dielectric strength of the solvent.

EXAMPLE 3 SECONDARY AMINE TERMINATED POLYAMIDES (ATPA)

Several ATPAs (labeled ATPA A, B, and C) were made from the reactants, and relative amounts thereof, as set forth in Table 4. In Table 4, "DTA" is an abbreviation for ditallow amine, "SA" is an abbreviation for stearyl amine, and PD-23 is a petroleum distillate, all of which are available from Witco Corporation (Greenwich, Conn.; http://www.witco.com). Selected properties for the ATPAs are also set forth in Table 4, including acid number, amine number, softening point ("S.P.") and the appearance when combined at 20 wt % solids in PD-23 petroleum distillate ("Appearance").

In preparing ATPAs, a 60/40 EDA/DTA equivalent ratio results in a material that forms a clear, hard gel in PD 23 distillate (at 20% solids). Increasing this ratio to 75/25 (see ATPA B) and 80/20 (see ATPA C) decreases the ATPAs solubility in PD-23 distillate, resulting in opaque, hard gels.

TABLE 4

PROPERTIES OF TERTIARY AMIDE-TERMINATED POLYAMIDES

| ATPA | Composition (eq. %) | Acid No. | Amine No. | S.P. (0° C.) | Appearance |
|---|---|---|---|---|---|
| A. | 100% EMPOL ™ 1008; 60% EDA, 40% DTA | 20.8 | 25.1 | 82.2 | clear, hard gel |
| B. | 100% EMPOL ™ 1008; 75% EDA, 25% DTA | 11.3 | 10.9 | 101.9 | opaque, hard gel |
| C. | 100% EMPOL ™ 1008; 80% EDA, 20 DTA | 10.3 | 8.0 | 146.9 | opaque, hard gel |

COMPARATIVE EXAMPLE 1 SECONDARY AMIDE TERMINATED POLYAMIDE

As a comparative example, a polyamide at the same diamine/mono-amine ratio (60/40) as used in ATPA A of Example 3 was prepared to determine if termination with a primary mono-amine would result in polyamide that gelled hydrocarbons. The composition, and certain properties of this polyamide, are set forth in Table 5. This material, "Comp. D" was not compatible with PD 23 hydrocarbon solvent.

TABLE 5

PROPERTIES OF PRIMARY AMINE-TERMINATED POLYAMIDE

| ID Code | Composition (eq. %) | Acid No. | Amine No. | S.P. (° C.) | Appearance |
|---|---|---|---|---|---|
| Comp. D | 100% EMPOL ™ 1008; 60% EDA, 40% DTA | 5.5 | 0.9 | 81.1 | two phases |

All publications and patent applications mentioned in this specification are herein incorporated by reference to the same extent as if each individual publication or patent application was specifically and individually incorporated by reference.

It will be appreciated by those skilled in the art that changes could be made to the embodiments described above without departing from the broad inventive concept thereof. It is understood, therefore, that this invention is not limited to the particular embodiments disclosed, but is intended to cover modifications within the spirit and scope of the present invention as defined by the appended claims.

What is claimed is:

1. An article comprising a moisture-sensitive or corrosion-sensitive substrate in contact with a protectant composition, the protectant composition comprising a polyamide gelling agent and a gelled solvent.

2. The article of claim 1 selected from the group consisting of a transmission cable and a telecommunication device.

3. The article of claim 1 wherein the polyamide gelling agent is an ester-terminated polyamide (ETPA) of the formula (1):

(1)

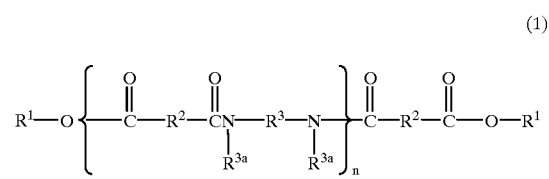

wherein, n designates a number of repeating units such that ester groups constitute from 10% to 50% of the total of the ester and amide groups;

$R^1$ at each occurrence is independently selected from $C_{1-42}$ hydrocarbon group;

$R^2$ at each occurrence is independently selected from $C_{2-42}$ hydrocarbon group;

$R^3$ at each occurrence is independently selected from an organic group containing at least two carbon atoms in addition to hydrogen atoms, and optionally containing one or more oxygen and nitrogen atoms; and $R^{3a}$ at each occurrence is independently selected from hydrogen, $C_{1-10}$ alkyl and a direct bond to $R^3$ or another $R^{3a}$ such that the N atom to which $R^3$ and $R^{3a}$ are both bonded is part of a heterocyclic structure defined in part by $R^{3a}$—N—$R^3$.

4. The article of claim 1 wherein the polyamide gelling agent is prepared by a method comprising reacting x equivalents of carboxylic acid from diacid or a reactive equivalent thereof, y equivalents of amine from diamine and z equivalents of hydroxyl from monoalcohol or a reactive equivalent thereof, where monoalcohol is substantially the only monofunctional reactant used to form the polyamide, and wherein each of x, y and z is greater than 0.

5. The article of claim 1 wherein the polyamide gelling agent is a tertiary amide-terminated polyamide of the formula (2):

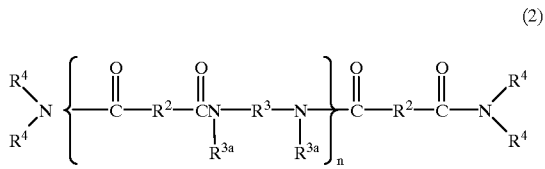

(2)

wherein, n designates a number of repeating units such that tertiary terminal amide groups constitute from 10% to 50% of the total amide groups;

$R^2$ at each occurrence is independently selected from $C_{2-42}$ hydrocarbon groups;

$R^3$ at each occurrence is independently selected from an organic group containing at least two carbon atoms in addition to hydrogen atoms, and optionally containing one or more oxygen and nitrogen atoms; and $R^{3a}$ at each occurrence is independently selected from hydrogen, $C_{1-10}$ alkyl and a direct bond to $R^3$ or another $R^{3a}$ such that the N atom to which $R^3$ and $R^{3a}$ are both bonded is part of a heterocyclic structure defined in part by $R^{3a}$—N—$R^3$;

$R^4$ at each occurrence is independently selected from $C_{1-22}$ hydrocarbon groups.

6. The article of claim 1 wherein the polyamide gelling agent is prepared by a method comprising reacting x equivalents of carboxylic acid from diacid or a reactive equivalent thereof, y equivalents of amine from diamine and z equivalents of amine from a secondary amine or a reactive equivalent thereof, where the secondary amine is substantially the only monofanctional reactant used to form the polyamide, and wherein each of x, y and z is greater than 0.

7. The article of claim 1 wherein the gelled solvent comprises mineral oil.

8. The article of claim 1 wherein the protectant composition further comprises a bleed inhibitor.

9. The article of claim 8 wherein the bleed inhibitor is selected from the group consisting of polyurethane elastomer, polyester elastomer, butadiene acrylonitrile copolymer, polyacrylate, acrylate copolymer and rubber block copolymer.

10. A method of protecting a moisture-sensitive or corrosion-sensitive substrate against moisture or corrosion comprising contacting the substrate with a protectant composition comprising a polyamide gelling agent and a gelled solvent.

11. The method of claim 10 wherein the polyamide gelling agent comprises an ester-terminated polyamide (ETPA) of the formula (1):

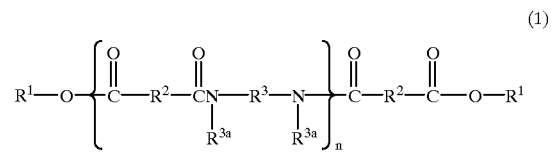

(1)

or a tertiary amide-terminated polyamide (ATPA) of the formula (2):

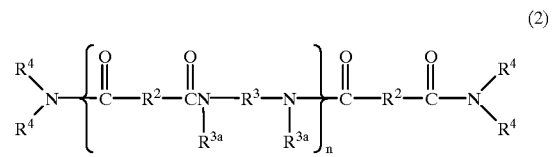

(2)

wherein, n designates a number of repeating units such that, in formula (1), ester groups constitute from 10% to 50% of the total of the ester and amide groups, and in formula (2) tertiary terminal amide groups constitute from about 10% to about 50% of the total amide groups;

$R^1$ at each occurrence is independently selected from $C_{1-42}$ hydrocarbon groups;

$R^2$ at each occurrence is independently selected from $C_{2-42}$ hydrocarbon groups;

$R^3$ at each occurrence is independently selected from an organic group containing at least two carbon atoms in addition to hydrogen atoms, and optionally containing one or more oxygen and nitrogen atoms;

$R^{3a}$ at each occurrence is independently selected from hydrogen, $C_1$ alkyl and a direct bond to $R^3$ or another $R^{3a}$ such that the N atom to which $R^3$ and $R^{3a}$ are both bonded is part of a heterocyclic structure defined in part by $R^{3a}$—N—$R^3$; and $R^4$ at each occurrence is independently selected from $C_{1-22}$ hydrocarbon groups.

12. The method of claim 10 wherein the polyamide gelling agent is prepared by either of methods (a) or (b), wherein (a) the agent is prepared by a method comprising reacting x equivalents of carboxylic acid from diacid or a reactive equivalent thereof, y equivalents of amine from diamine and z equivalents of hydroxyl from monoalcohol or a reactive equivalent thereof, where monoalcohol is substantially the only monofunctional reactant used to form the agent, and wherein each of x, y and z is greater than 0; and (b) the agent is prepared by a method comprising reacting x equivalents of carboxylic acid from diacid or a reactive equivalent thereof, y equivalents of amine from diamine and z equivalents of amine from a secondary amine or a reactive equivalent thereof, where the secondary amine is substantially the only monofunctional reactant used to form the agent, and wherein each of x, y and z is greater than 0.

13. The method of claim 10 wherein the gelled solvent comprises mineral oil.

14. The method of claim 10 wherein the moisture-sensitive or corrosion-sensitive substrate is a telecommunication device or a transmission cable.

15. A protectant composition comprising a polyamide gelling agent, a gelled solvent and a bleed inhibitor.

16. The composition of claim 15 wherein the polyamide gelling agent comprises an ester-terminated polyamide (ETPA) of the formula (1):

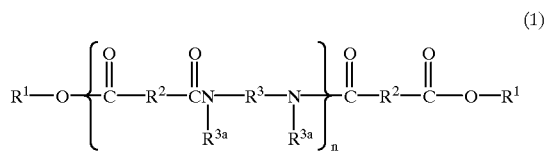

(1)

or a tertiary amide-terminated polyamide (ATPA) of the formula (2):

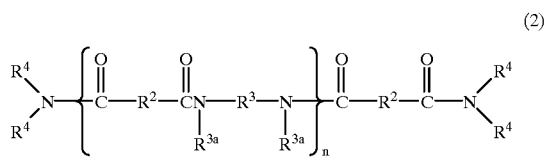

(2)

wherein, n designates a number of repeating units such that, in formula (1), ester groups constitute from 10% to 50% of the total of the ester and amide groups, and in formula (2) tertiary terminal amide groups constitute from 10% to 50% of the total amide groups;

$R^1$ at each occurrence is independently selected from $C_{1-42}$ hydrocarbon groups;

$R^2$ at each occurrence is independently selected from $C_{2-42}$ hydrocarbon groups;

$R^3$ at each occurrence is independently selected from an organic group containing at least two carbon atoms in addition to hydrogen atoms, and optionally containing one or more oxygen and nitrogen atoms;

$R^{3a}$ at each occurrence is independently selected from hydrogen, $C_{1-10}$ alkyl and a direct bond to $R^3$ or another $R^{3a}$ such that the N atom to which $R^3$ and $R^{3a}$ are both bonded is part of a heterocyclic structure defined in part by $R^{3a}$—N—$R^3$; and $R^4$ at each occurrence is independently selected from $C_{1-22}$ hydrocarbon groups.

17. The composition of claim 15 wherein the polyamide gelling agent is prepared by either of methods (a) or (b), wherein (a) the agent is prepared by a method comprising reacting x equivalents of carboxylic acid from diacid or a reactive equivalent thereof, y equivalents of amine from diamine and z equivalents of hydroxyl from monoalcohol or a reactive equivalent thereof, where monoalcohol is substantially the only monofunctional reactant used to form the agent, and wherein each of x, y and z is greater than 0; and (b) the agent is prepared by a method comprising reacting x equivalents of carboxylic acid from diacid or a reactive equivalent thereof, y equivalents of amine from diamine and z equivalents of amine from a secondary amine or a reactive equivalent thereof, where the secondary amine is substantially the only monofunctional reactant used to form the agent, and wherein each of x, y and z is greater than 0.

18. The composition of claim 15 wherein the bleed inhibitor is selected from the group consisting of polyurethane elastomer, polyester elastomer, butadiene acrylonitrile copolymer, polyacrylate, acrylate copolymer and rubber block copolymer.

19. A method of preparing a protectant composition comprising the steps of dissolving a polyamide gelling agent in a solvent at an elevated temperature in excess of 35° C.; combining a bleed inhibitor with the polyamide gelling agent; and cooling the resulting composition comprising polyamide gelling agent, solvent and bleed inhibitor to a cooled temperature less than 35° C.

20. The method of claim 19 wherein the polyamide gelling agent comprises an ester-terminated polyamide (ETPA) of the formula (1):

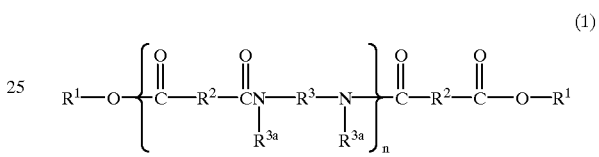

(1)

or a tertiary amide-terminated polyamide (ATPA) of the formula (2):

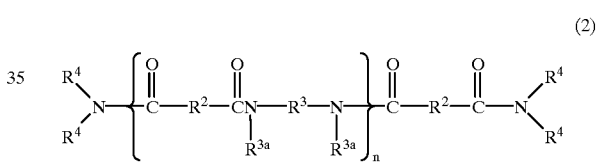

(2)

wherein, n designates a number of repeating units such that, in formula (1), ester groups constitute from 10% to 50% of the total of the ester and amide groups, and in formula (2) tertiary terminal amide groups constitute from 10% to 50% of the total amide groups;

$R^1$ at each occurrence is independently selected from $C_{1-42}$ hydrocarbon groups;

$R^2$ at each occurrence is independently selected from $C_{2-42}$ hydrocarbon groups;

$R^3$ at each occurrence is independently selected from an organic group containing at least two carbon atoms in addition to hydrogen atoms, and optionally containing one or more oxygen and nitrogen atoms;

$R^{3a}$ at each occurrence is independently selected from hydrogen, $C_{1-10}$ alkyl and a direct bond to $R^3$ or another $R^{3a}$ such that the N atom to which $R^3$ and $R^{3a}$ are both bonded is part of a heterocyclic structure defined in part by $R^{3a}$—N—$R^3$; and $R^4$ at each occurrence is independently selected from $C_{1-22}$ hydrocarbon groups.

* * * * *

UNITED STATES PATENT AND TRADEMARK OFFICE
CERTIFICATE OF CORRECTION

PATENT NO.   : 6,169,160 B1
DATED        : January 2, 2001
INVENTOR(S)  : MacQueen et al.

It is certified that error appears in the above-identified patent and that said Letters Patent is hereby corrected as shown below:

Column 19, claim 6,
Line 60, "only monofactional reactant" should read as -- only monofunctional reactant --.

Column 20, claim 11,
Line 46, "hydrogen, $C_1$ alkyl" should read as -- hydrogen, $C_{1-10}$ alkyl --.

Column 22, claim 19,
Lines 14 & 15 "excess of 35° C.; combining" should read as -- excess of 35° C; combining --.

Signed and Sealed this

Sixteenth Day of October, 2001

Attest:

*Nicholas P. Godici*

NICHOLAS P. GODICI
*Attesting Officer*    *Acting Director of the United States Patent and Trademark Office*